(12) United States Patent
Kaneko

(10) Patent No.: US 6,672,679 B2
(45) Date of Patent: Jan. 6, 2004

(54) BEARING UNIT FOR WHEEL AND METHOD OF MANUFACTURING THE SAME

(75) Inventor: Takeyasu Kaneko, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/789,846

(22) Filed: Feb. 22, 2001

(65) Prior Publication Data
US 2001/0019223 A1 Sep. 6, 2001

(30) Foreign Application Priority Data
Feb. 23, 2000 (JP) .................................. P 2000-045479

(51) Int. Cl.⁷ .............................................. B60B 27/00
(52) U.S. Cl. .................. 301/105.1; 301/6.1; 29/898.09; 188/18 A; 188/218 XL; 384/544
(58) Field of Search ................. 301/6.1, 6.8, 105.1, 301/35.621; 180/252, 258, 259; 188/218 XL, 18 A; 384/544; 29/898.07, 434

(56) References Cited

U.S. PATENT DOCUMENTS

| | | | |
|---|---|---|---|
| 5,430,926 A | * 7/1995 | Hartford | 29/434 |
| 5,651,588 A | * 7/1997 | Kato | 301/105.1 X |
| 5,727,886 A | * 3/1998 | Hata et al. | 384/544 X |
| 5,782,565 A | * 7/1998 | Bertetti et al. | 384/544 X |
| 5,842,388 A | 12/1998 | Visser et al. | 82/1.11 |
| 5,884,980 A | 3/1999 | Visser et al. | 301/6.1 |
| 5,927,820 A | * 7/1999 | Vignotto et al. | 301/105.1 |
| 5,937,499 A | * 8/1999 | Austin et al. | 29/434 |
| 6,035,507 A | * 3/2000 | Bianchi | 188/18 A |
| 6,230,848 B1 | * 5/2001 | Niebling et al. | 188/18 A |

FOREIGN PATENT DOCUMENTS

| | | |
|---|---|---|
| JP | 2001-1711 | 1/1991 |
| JP | 7-164809 | 6/1995 |
| JP | 10-217001 | 8/1998 |
| JP | 11-294425 | 10/1999 |

* cited by examiner

Primary Examiner—Russell D. Stormer
(74) Attorney, Agent, or Firm—Sughrue Mion, PLLC

(57) ABSTRACT

At a surface opposite to a mounting surface 28 at a part of the mounting flange 13, a projecting part 27 is provided so as to surround the opening part of the mounting holes 23 for press-fitting each stud thereinto. A finishing process of the mounting surface 28 is carried out after the stud 24 is press-fitted into the mounting hole 23.

2 Claims, 6 Drawing Sheets

BEARING UNIT FOR WHEEL AND METHOD OF MANUFACTURING THE SAME

BACKGROUND OF THE INVENTION

1. Field of the Invention

The present invention relates to an improvement of a bearing unit for wheel for supporting a wheel of an automobile as well as a rotary body for braking such as a rotor or a drum, and to an improvement of a method of manufacturing such a bearing unit for wheel.

2. Description of the Related Art

A wheel 1 constituting a traveling wheel of an automobile and a rotor 2 constituting a disc brake as a braking apparatus are rotatably supported by a knuckle 3 which constitutes a suspending apparatus with a structure, for example, as shown in FIG. 8. To be specific, a circular supporting hole 4 is formed in the knuckle 3. An outer ring 6 being a stationary ring constituting a bearing unit 5 for the wheel, to which the present invention is applied, is fixed to within the supporting hole 4 by use of a plurality of bolts 7. On the other hand, the wheel 1 and the rotor 2 are fixedly connected to a hub 8 as a component of the wheel bearing unit 5 through a plurality of studs 9 and a plurality of nuts 10.

Outer ring double raceways 11a, 11b each serving as a stationary-side raceway surface are formed in an inner circumference of the outer ring 6, and a joint flange 12 is provided on an outer circumference thereof. The thus configured outer ring 6 is fixed to the knuckle 3 by connecting the joint flange 12 to the knuckle 3 by the bolts 7.

On the other hand, a mounting flange 13 is formed at a portion projecting from an outer end opening of the outer ring 6, and the flange 13 is formed at a part of the outer circumference of the hub 8. (Herein, the term "outer" implies an outside portion in the width direction in a state of being assembled to the automobile, that is, the left side in FIGS. 1 through 4, 6 and 8. In contrast, the term "inner" implies a central portion in the width direction in the state of being assembled to the automobile, that is, the right side in FIGS. 1 through 4, 6 and 8). The wheel 1 and the rotor 2 are fixedly connected in combination to one side surface of the flange 13 (in general, the outer side as illustrated) through the studs 9 and nuts 10. Further, an inner ring raceway 14a is formed in a portion, facing to the more external raceway 11a of the outer ring double raceways 11a, 11b, of the outer peripheral face of an intermediate portion of the hub 8. Moreover, an inner ring is fixedly connected onto a small-diameter stepped portion 15 formed at the inner end of the hub 8. An inner ring raceway 14b formed at the outer peripheral of the inner ring 16 is disposed opposite to the more internal raceway 11b of the outer ring double raceways 11a, 11b.

Balls 17, 17 each defined as a rolling member are provided in a rollable manner by pluralities between the outer ring raceways 11a and 11b and the inner ring raceways 14a and 14b, in a state of being held by retainers 18, 18. With this structure being provided, a double-row angular ball bearing with a back face combination is structured, the hub 8 is rotatably supported in the inner side of the outer ring 6 so as to support radial and thrust loads. Between the inner peripheries of both ends of the outer ring 6, the outer periphery of the intermediate portion of the hub 8, and the outer periphery of the inner end of the inner ring 16, seal rings 19a, 19b are provided respectively to intercept a space holding the balls 17, 17 from an outside space. Further, since the illustrated embodiment is the wheel bearing unit 5 for a drive wheel (a rear wheel of FR car and RR car, a front wheel of FF car and all wheels of 4WD car), the hub 8 has a spline hole 20 formed at the center thereof. Then, a spline shaft 22 of a constant speed joint 21 is inserted into the spline hole 20.

When the rolling bearing unit 5 for the wheel is used, the outer ring 6 is fixedly connected to the knuckle 3 and at the same time the wheel 1 combined with a tire (not shown) and the rotor 2 are fixedly connected to the fitting flange 13 of the hub 8, as shown in FIG. 8. The rotor 2 of these components is combined with a support and a caliper (both not shown) which are fixed to the knuckle 3, thus constituting a disc brake for braking. When braking operation, a pair of pads sandwiching the rotor 2 are pressed against both side surfaces of the rotor 2.

It is known that vibrations called as a judder followed by unpleasant noises often occur when braking the automobile. As one of various causes of these vibrations, known is an ununiform state of frictions between the side surface of the rotor 2 and the lining of the pad, however, deflections of the rotor 2 are also known as other causes. Deflection of the rotor 2 is also a big cause. That is, the side surface of the rotor 2 must be substantially normal to the rotation center of the rotor 2. It is, however, difficult to obtain a perfect perpendicularity due to an unavoidable manufacturing error. As a result, while the car is running, the side surface of the rotor 2 will inevitably deflect in the direction of the rotation axis (left and right directions in FIG. 8) though being more or less. When the deflection is increased (displacing amount in the left and right directions in the same), and the linings of the pair of pads are pressed against both sides of the rotor 2 for braking, the judder is produced.

For restraining the judder generated by such causes, it is important to suppress (improve) the deflection (axial deflection) in the axial directions of the side surfaces of the rotor 2. And for preventing this deflection, it is necessary to improve a perpendicularity of the mounting surface (one side surface of the mounting flange 13) of the mounting flange 13 with respect to the rotational center of the hub 8 as well as the surface precision of the mounting surface itself. There respectively exist a plurality of factors giving influences to the perpendicularity and the surface precision. As remarkably influencing factors, they are, as to the perpendicularity, a parallelism between the mounting surface and the raceway surface (the outer ring raceways 11a, 11b and the inner ring raceways 14a, 14b), and as to the surface precision, a heat treatment deformation, and elastic deformation or plastic deformations accompanied with press-fitting of the studs 9 into the mounting holes. Further, for heightening the parallelism of these factors, among the constructive elements of the hub 8, there must be a necessity for setting highly accurately a positional relationship between the mounting surface of the mounting flange 13, the inner ring raceway 14a formed in the outer periphery of the intermediate portion thereof and the stepped part 15 of small diameter formed at the inner end of the same, and configurations and dimensions of these components. If the precision of shapes and dimensions of the inner ring raceway 14a and the small-diameter stepped portion 15 are enhanced in connection to the mounting surface, the perpendicularity of the mounting surface with respect to the rotational center of the hub 8 may be increased. Further, if removing the heat treatment deformation, elastic or plastic deformation of the mounting surface, the surface precision of the mounting surface may be enhanced.

A technology for preventing the deflection of the flange 13 which conduces to the deflection of the rotor 2 is disclosed, for example, in JP-A-10-217001. However, since the prior art disclosed in this publication precisely finishes a surface which is not originally needed as a reference surface, not only a cost increases, but also no consideration is taken for applying a heat treatment to the respective components. On the other hand, since the inner ring raceway 14a and the small-diameter stepped portion 15 are hardened over the surfaces thereof, a heat treatment such as a high frequency hardening is required. Since the configurations and dimensions of the inner ring raceway 14a and the small-diameter stepped portion 15 are more or less changed due to the heat treatment, according to the prior art disclosed in the publication, it is difficult to sufficiently heighten the precision of each components in the way described above. Moreover, the prior art invention has a structure of fixing to the outer periphery of the hub a pair of inner rings being independent from the hub. Therefore, an error, etc. between the end surface of each inner ring and each inner ring raceway is included as an error of the parallelism between the mounting surface of the mounting flange and the inner ring raceway. Further, since the contact portion between the hub and the inner ring is not processed based on the mounting surface of the mounting flange, it is difficult to sufficiently increase the parallelism between the mounting surface and the inner ring raceway.

Moreover, in order to offset the deflection of the mounting flange 13 and the deflection of the rotor 2 based on the configuration error of the rotor 2 itself, the wheel bearing unit 5 and the rotor 2 are selectively combined, or after the wheel bearing unit 5 and the rotor 2 are combined, the side of the rotor 2 is processed. However, in a case of the former, the selecting operation for combination is troublesome, and in a case of the latter, the mechanical apparatus for processing is complicated and becomes large in size, resulting in an increase in cost in both cases.

Further, in any cases of the conventional structures, any consideration was not taken to the deformation caused in the mounting surface of the mounting flange 13, which is accompanied by the fixation of the stud 9 to the mounting flange 13. A technique giving consideration to the deformation in the mounting surface is known in JP-A-11-294425. According to the conventional technique disclosed in the document, in order to press-fit the base portion of the stud into a mounting hole formed in the mounting flange, it is intended to locate a serration part at the intermediate portion in an axial direction of the mounting hole, which serration is provided at the outer periphery of the base portion of the stud. More precisely, it is intended to secure 13% or more of the thickness of the mounting flange 13 for the distance between both ends of the mounting flange and the end of the serration part.

In such a conventional structure, the deformation of the mounting surface accompanied with press-fitting the stud into the mounting flange is simply considered, and the effect cannot be expected so much. Namely, even if the distance between the mounting flange 13 and the end of the serration part is separated around 13% of the thickness of the mounting flange 13, it is highly probable that the mounting surface is deformed to such a degree as to influence the generation of judder. In contrast, in case the width of the serration part is reduced for increasing the distance, it becomes difficult to surely prevent the stud from being turned.

SUMMARY OF THE INVENTION

In view of such circumstances, the wheel bearing unit and the manufacturing method thereof of the invention has been realized.

Of the wheel bearing unit and the manufacturing method thereof, the wheel bearing unit as described in the first and second aspects of the invention comprises, similarly to the conventional wheel bearing unit, a stationary ring having a stationary-side raceway surface provided at a stationary-side periphery thereof, and fixedly supported by a suspending apparatus under a condition of being used; a rotary ring having a rotary side-raceway surface provided at the rotary side-periphery thereof and hardened by a heat treatment; a plurality of rolling elements provided between the rotary side-raceway surface and the stationary-side raceway surface; a mounting flange provided at the outer periphery of the rotary ring, for fixedly connecting a rotary body for braking and a wheel to a mounting surface which is one side surface thereof under a condition of being used, said mounting flange having plural mounting holes communicating between the one side surface and the other side surface; and a plurality of studs, each of which has a distal end protruded from the mounting surface under a condition where the respective base portions thereof are press-fitted into plural mounting holes formed at the mounting flange.

Especially according to the wheel bearing unit described in the first aspect of the invention, a portion surrounding an end open of each of said mounting holes at least projects at the other side surface of the mounting flange in an axial direction than a remaining portion of the mounting flange, and the surrounding portion of each mounting hole is thicker than the remaining portion of the mounting flange.

Further, according to the wheel bearing unit described in the second aspect of the invention, the mounting surface of the mounting flange is processed into a predetermined shape, after the rotary side-raceway surface thereof is heat-treated, and the base portion of each stud is fixedly press-fitted into the mounting hole.

Further, a method of manufacturing a bearing unit for a wheel of vehicle as set forth in a fourth aspect of the invention comprises the steps of: hardening the rotary side-raceway surface of the rotary ring by a heat treatment; press-fitting the base portion of each stud into each hole of the mounting flange to fix the stud therein; processing the mounting surface of the mounting flange into a predetermined configuration; and processing the rotary side-raceway surface into a predetermined configuration and dimension by utilizing the processed mounting surface as a reference surface.

According to the wheel bearing unit of the invention composed as mentioned above and the manufacturing method thereof, it is possible to eliminate influences causing the deformation in the mounting surface of the mounting flange accompanied with press-fitting to fix the base portions of the studs into the mounting holes formed in the mounting flange.

Namely, according to the wheel bearing unit as described in the first aspect of the invention, the fitting by tightening the base portion of each stud and each mounting hole can be performed at the protruded portion of the other side which is largely separate from the mounting surface. Therefore, the deformation accompanied with the press-fitting insertion of the stud is difficult to reach the mounting surface, thereby enabling to secure the surface precision of the mounting surface.

Further, according to the wheel bearing unit and the manufacturing method thereof described in the second and third aspects of the invention, by press-fitting the base portion of the stud into the mounting hole, although the surface precision in the mounting surface of the mounting flange is deteriorated, since deteriorated parts are cut out by a subsequent processing, influences by the deterioration in the surface precision by the press-fitting insertion can be eliminated.

As a result, it is possible to check deflection of the braking rotary body fixed to the mounting flange and prevent generation of the judder caused at braking operation.

DETAILED DESCRIPTION OF THE PREFERRED EMBODIMENTS

Figure 1:
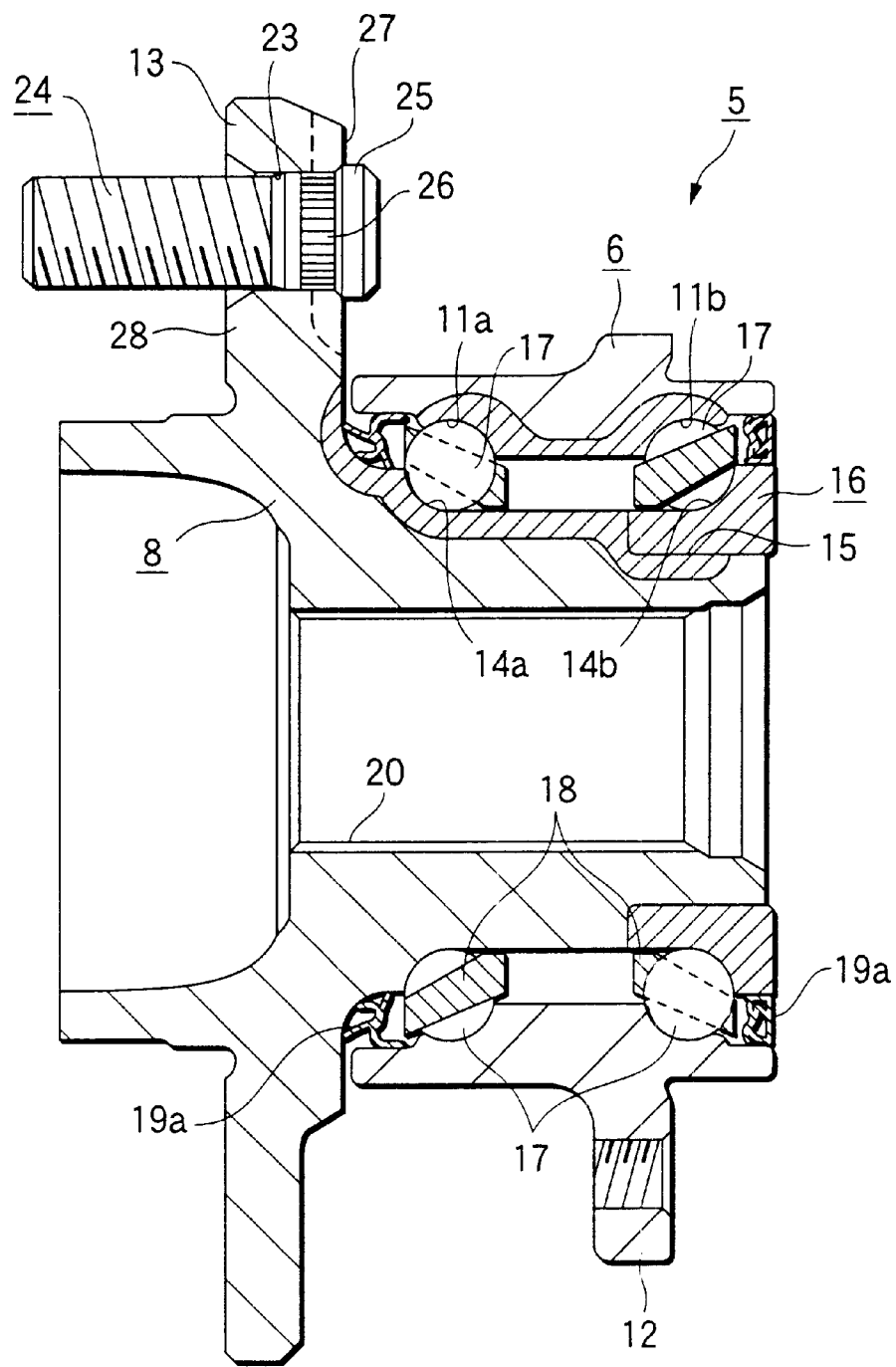
FIG. 1 is a cross sectional view showing a first embodiment of the invention.
Figure 2:
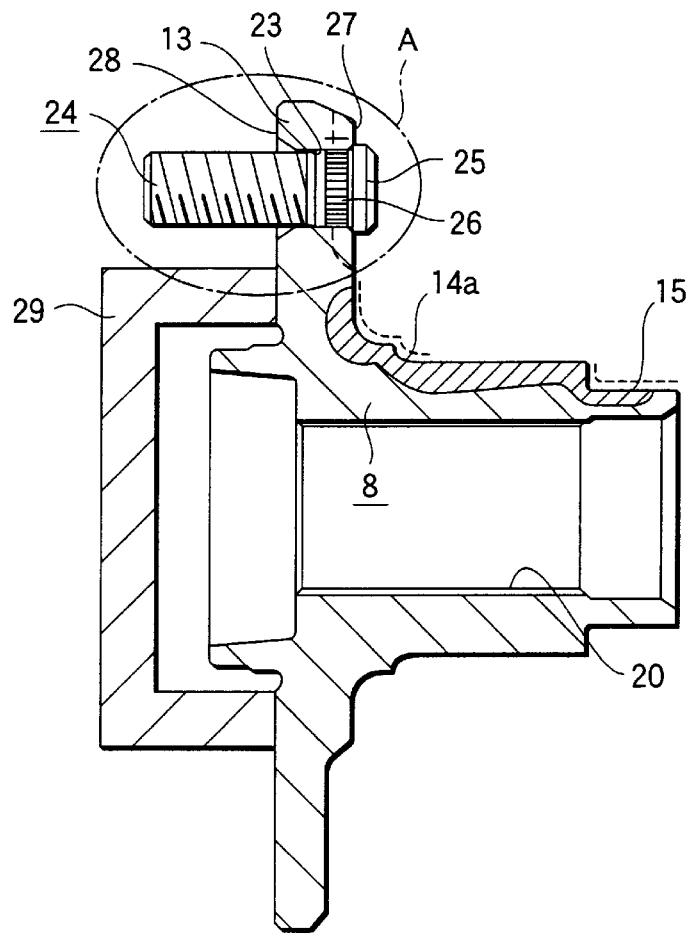
FIG. 2 is a cross sectional view showing a condition of processing the outer circumference of the hub in the first embodiment.
Figure 3:
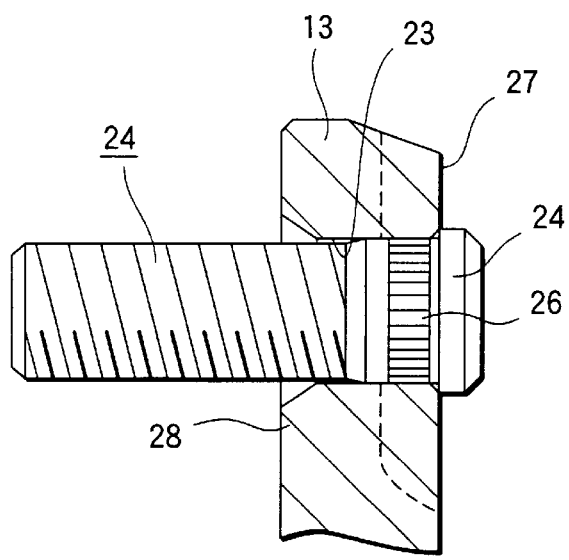
FIG. 3 is an enlarged view of a part A of FIG. 2.
Figure 8:
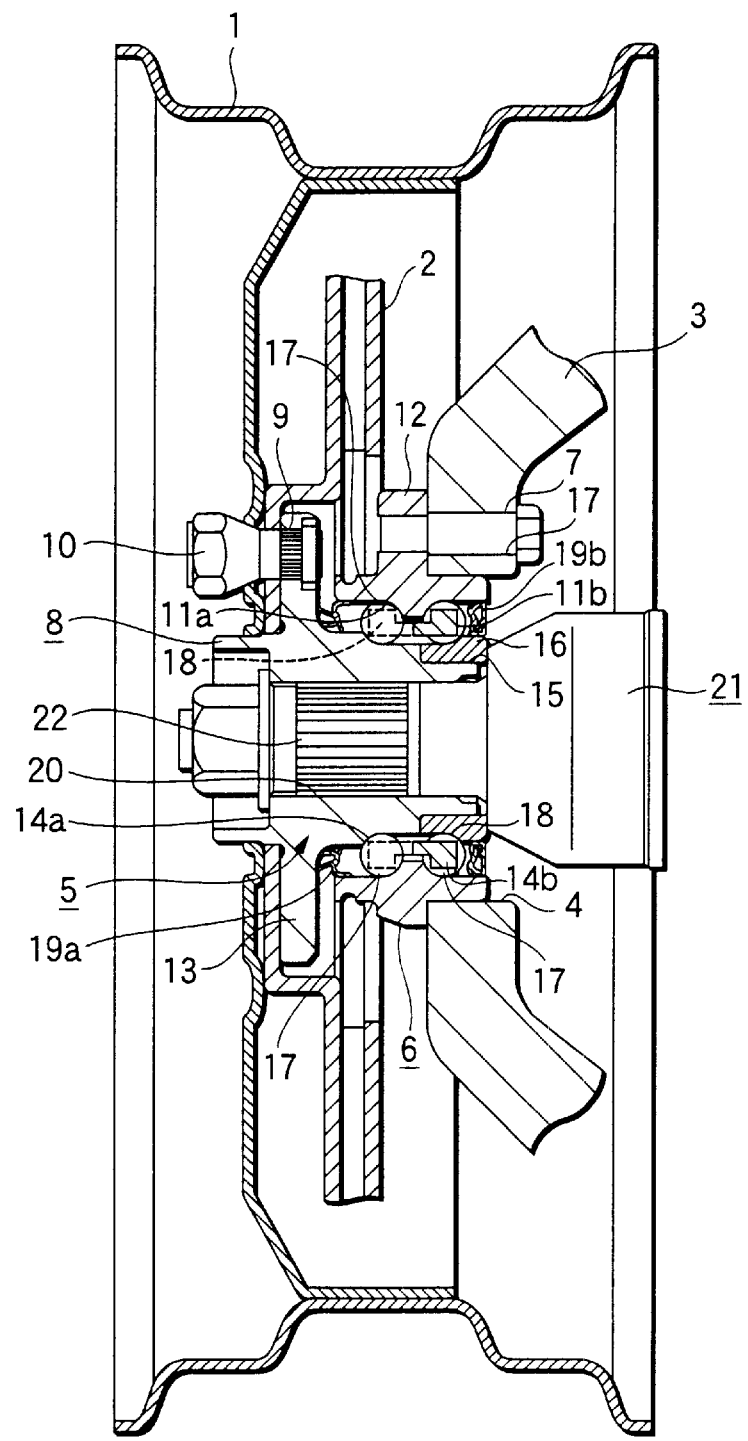
FIG. 8 is a cross sectional view showing one example of setting up the wheel bearing unit being an object of the invention.

FIGS. 1 through 3 show a first embodiment of the invention. At the outer peripheral surface of the outer ring 6 which is the stationary ring, there is provided a joint flange 12 for fixedly connecting the outer ring 6 to the knuckle 3 (FIG. 8). At the inner peripheral surface of the outer ring 6 which is a stationary-side peripheral surface, there are formed the outer ring double raceways 11a, 11b which are respectively the stationary-side raceway surfaces. A portion, indicated by the lattice-hatching in an upper half part of FIG. 1, which is at the inner peripheral surface of an intermediate portion the outer ring 6, including these outer ring raceways 11a, 11b, is hardened over its entire periphery by a high-frequency hardening.

Of the outer peripheral surfaces of the hub 8 and the inner ring 16 corresponding to the rotary rings, areas facing to the outer bearings 11a, 11b respectively, there are provided the inner ring raceways 14a, 14b corresponding to the rotary side-raceway surfaces. To be more specific, the inner bearing 14a is formed directly in an outer peripheral surface of the intermediate portion of the hub 8, and the inner ring 16 having the inner ring raceway 14b formed in its outer peripheral surface is fixedly fitted to a small-diameter stepped portion 15 formed in the inner end part of the hub 8. The inner ring 16 is made of a hard metal like the bearing steel such as SUJ2 and is hardened to a core part by the hardening process. The hub 8 has a mounting flange 13 is provided at a portion closer to the outer side end of the intermediate portion and protruding from the outer end opening of the outer ring 6. The mounting flange 13 fixes a wheel 1 constituting a traveling wheel and a rotor 2 (FIG. 8) or a drum serving as a rotary body for braking.

At a plurality of positions in the circumferential direction of the mounting flange 13, mounting holes 23 are formed respectively on the same circumference around a rotational center of the hub 8. The base portions of studs 24 are fixedly fitted in these mounting holes 23. The stud 24 has a collar 25 formed at the base end surface thereof, and has a serration portion 26 formed, closer to the base portion, on the outer periphery of the intermediate portion. The thus configured stud 24 is inserted into the mounting hole 23 from an inside to an outside (from right to left in FIGS. 1 and 2), and the serration portion 26 is press-fitted into the mounting hole 23, and at the same time, the collar 25 is made to impinge upon an inside surface of the mounting flange 13.

Especially, in this embodiment, at the inside surface which is the other side surface of the mounting flange 13 (the right side of FIGS. 1 to 3) and at a part surrounding the opening at the end of the mounting hole 23, the mounting flange 13 has a portion 27 projecting inwardly in the axial direction than other parts. And the surrounding part around the mounting hole 23 is made thicker than other parts, i.e., which are off from the periphery of the opening of each mounting hole 23 in the circumferential direction. The serration portion 26 is press-fitted into the portion corresponding to the protruding portion 27 of the mounting hole 23. By the way, the protruding portion 27 may be continuously formed over all the circumference, but taking reduction of weight and later mentioned prevention of deformation of a mounting surface 28 into consideration, it is preferable that each protruding portion 27 is independently formed per each mounting hole 23 and intermittently in the circumferential direction.

In this embodiment, since the protruding portion 27 is provided on the inside surface of the mounting flange 13, the mounting surface 28 of the mounting flange 13 is prevented from being suffered from a deformation which is harmful in view of prevention of the judder. Namely, in this embodiment, the outside surface (the left side in FIGS. 1 to 3) which is one side surface of the mounting flange 13 is the mounting surface 28 to which the wheel 1 and the rotor 2 are mounted. For preventing generation of the judder, it is necessary to prevent deterioration in the shape precision of the mounting surface 28 to the most. When the serration portion 26 of the stud 24 is inserted into the mounting hole 23, the mounting flange 13 is more or less deformed at the portion in the neighborhood of the mounting hole 23. In case that the deformation comes to the mounting surface 28 which is the outside surface of the mounting flange 13 to cause the mounting surface 28 to deform in a convex direction, the deflection of the rotor 2 which is fixedly connected to the mounting surface 28 becomes large.

In contrast to this, according to this embodiment, since the mounting flange 13 has the protruding portion 27 formed at the inside surface thereof, and the serration portion 26 is tightened to closely fit the mounting hole 23 within the inside thereof, the deformation accompanied with the fitting engagement does not reach the mounting surface 28. In other words, in case the serration potion 26 provided at the base portion of the stud 24 is press-fitted into the mounting hole 23, the mounting surface 28 is not deformed in the convex direction. Further, since the width of the serration portion 26 need not be specifically reduced to prevent such a deformation, the stud 24 can be surely prevented from being rotated. Further, in the illustrated embodiment, since a chamfered portion of large diameter is formed by, for example, a spot face processing or lathe processing at the end of the mounting hole 23 and at the opening of the side of the mounting surface 28, it is possible to more exactly prevent the deformation of the mounting surface 28 in the convex direction accompanied with press-fitting the serration portion 26.

The part at the outer peripheral face of the hub 8 shown by the slant lattice pattern at an upper half part of FIGS. 1 and 2, is hardened allover the periphery by a high frequency hardening. Namely, a blank material is subjected to the lathe process to make the hub 8 and is subsequently treated with the high frequency hardening at the part shown by the slanted lattice pattern. The base portion of the mounting flange 13 is hardened for preventing this part from plastic deforming in spite of a large moment effected to the mounting flange 13 during running. The portion of the inner bearing raceway 14a is hardened for preventing injuries, in spite of a large pressure applied to contacting parts in relation with later mentioned balls 17, 17. The small-diameter stepped portion 15 is hardened for preventing the plastic deformation in spite of a large radial load applied thereto from the inner ring 16. Further, the part between the small-diameter stepped portion 15 and the inner bearing raceway 14a is hardened for preventing the plastic deformation in spite of a large moment load and a large thrust load applied thereto during running.

Between the outer ring raceways 11a, 11b and the inner ring raceways 14a, 14b, there are rollably provided a plurality of rolling elements, that is, balls 17, 17 as being held by retainers 18, 18 respectively. With this structure, the hub 8 may be rotatably supported in the inner diameter-side of the outer ring 6 and may support the wheel 1 and the rotor 2 rotatably relative to the knuckle 3. Further, between the inner peripheries of both ends of the outer ring 6, the outer periphery at the intermediate portion of the hub 8 and the outer periphery of the inner end of the inner ring 16, there are provided seal rings 19a, 19b respectively to intercept the space holding the balls 17, 17 from the outer space, and to prevent the grease sealed in the space from leaking out from the space and further to prevent foreign matters from coming into the space.

In the above mentioned wheel bearing unit 5, the mounting surface 28 of the mounting flange 13 for fixedly connecting the wheel 1 and the rotor 2, is processed into the predetermined shape by hardening, through the high frequency hardening as one kind of the heat treatments, the outer circumference of the intermediate portion of the hub 8 shown at the upper halves with the slant lattices in FIGS. 1 and 2. That is, the part of the slant lattice is performed with the high frequency heating treatment to be hardened, and when the deformation based on the heat treatment occurs in the hub 8, the mounting surface 28 is subjected to the machining such as lathe turning to be flat. Then, not only the part to be struck with the rotor 2 (FIG. 8) but also a part to be struck with a later mentioned backing plate 29 are processed to be flat.

Further, the inner bearing raceway 14a directly formed in the outer circumference of the intermediate portion of the hub 8, the outer circumference of the small-diameter stepped portion 15 formed in the inner end part of the hub 8 and the stepped surface are processed to be predetermined configurations and dimensions with reference to the mounting surface 28 as shown in FIG. 2 after the base end part of the stud 24 is fixedly press-fitted into the mounting hole 23 of the mounting flange 13.

Figure 6:
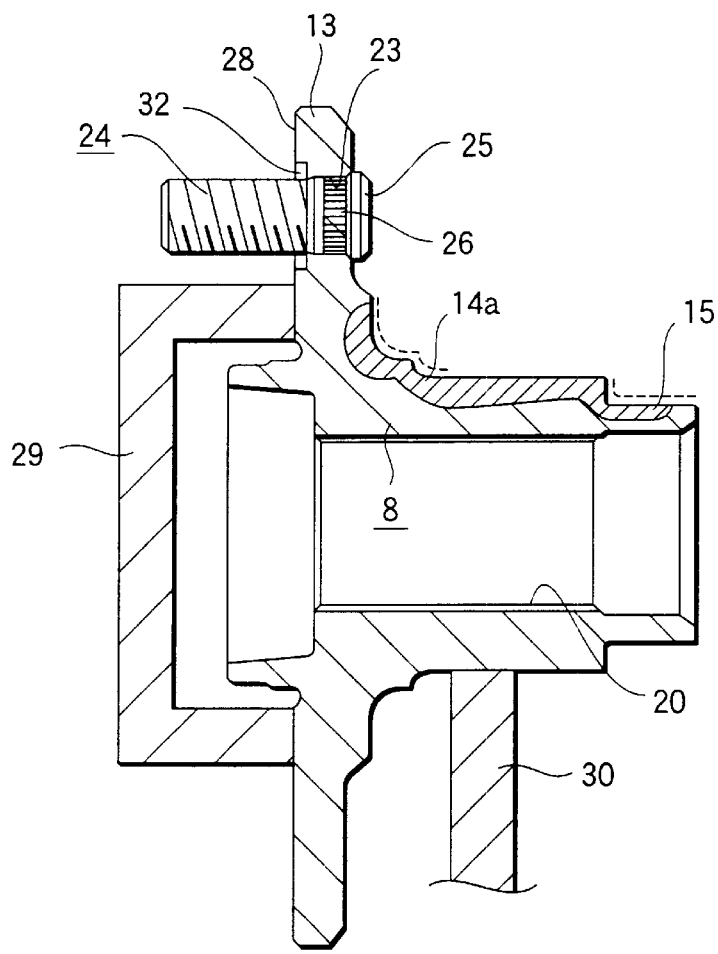
FIG. 6 is a cross sectional view showing a state of processing the outer circumference of the hub in the second embodiment of the invention.
Figure 7:
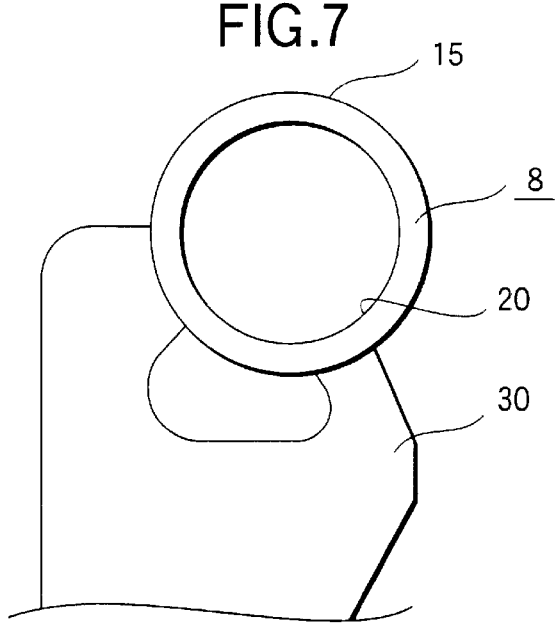
FIG. 7 is a view seen from the right side of FIG. 6, showing a state, partially omitting, of the shoe supporting the outer circumference of the hub.

Namely, a portion of the mounting surface 28 sticking out from the stud 24 is struck with the backing plate 29, and at the same time the backing plate 29 and the mounting flange 13 are connected by magnetic absorption. When the backing plate 29 is rotated, the hub 8 is rotated. Then, the rotational center of the hub 8 is an axis perpendicular to the mounting surface 28. A shoe 30 (See FIGS. 6 and 7 showing a later mentioned second embodiment) is slidably connected to the outer circumference of the hub 8, and while positioning the hub 8 over radial directions, the outer circumferences of the inner ring raceway 14a and the small-diameter stepped portion 15 and the stepped surface are carried out with the machining such as grinding or the precision lathe machining so as to be formed in predetermined configurations of these respective surfaces.

Since the machining process is carried out as turning around the axis perpendicular to the mounting surface 28, the relative position is regular between the mounting surface 28, the inner ring raceway 14a directly formed in the outer circumference of the intermediate portion of the hub 8 and the inner ring raceway 14b in the outer circumference of the inner ring 16 (FIG. 1) externally fitted on the small-diameter stepped portion 15, in spite of the thermal deformation due to the high frequency hardening treatment. As a result, under the condition of setting up the wheel bearing unit 5 as shown in FIG. 1, the deflection of the mounting surface 28 can be reduced. As the shape and precision of the mounting flange 28 are good as mentioned above, though each stud 24 is press-fitted into the mounting hole, the deflection of the rotor (FIG. 8) secured to the mounting flange 13 can also be reduced. A series of these processes includes providing a blank material, lathe machining, high frequency hardening, lathe machining of the mounting surface of the mounting flange, grinding of the inner ring raceway in reference to the mounting surface and press-fitting of the stud.

FIGS. 4 through 7 show a second embodiment of the invention. In the case of this embodiment, the mounting surface 28 of the flange 13 is heat-treated in the outer circumference of the intermediate portion of the hub 8 at the part shown at the upper halves with the slant lattices in FIGS. 4 and 6, and is processed to be formed in a predetermined configuration after the base end part of the stud 24 is fixedly press-fitted into the mounting hole 23 of the mounting flange 13.

Figure 4:
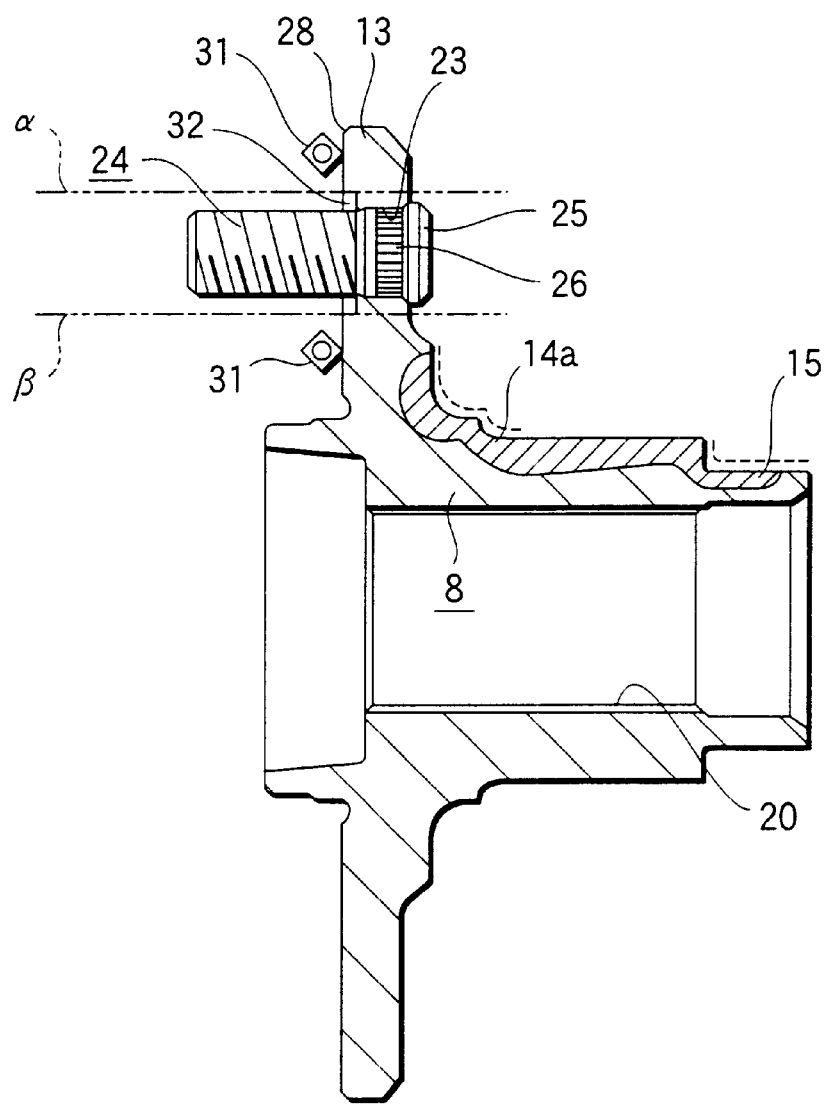
FIG. 4 is a cross sectional view showing a state of finish-processing the mounting surface of the mounting flange in a second embodiment of the invention.

In this embodiment, the mounting surface 28 of the flange 13 is, as shown in FIG. 4, processed with the precise finish to be a desired configuration and dimension in a state that the stud 24 is fixed to the mounting flange 13. Therefore, as rotating the hub 8 around its central axis and abutting finishing tools 31, 31 to the mounting surface 28, the mounting surface 28 is subjected to the finishing process.

Figure 5:
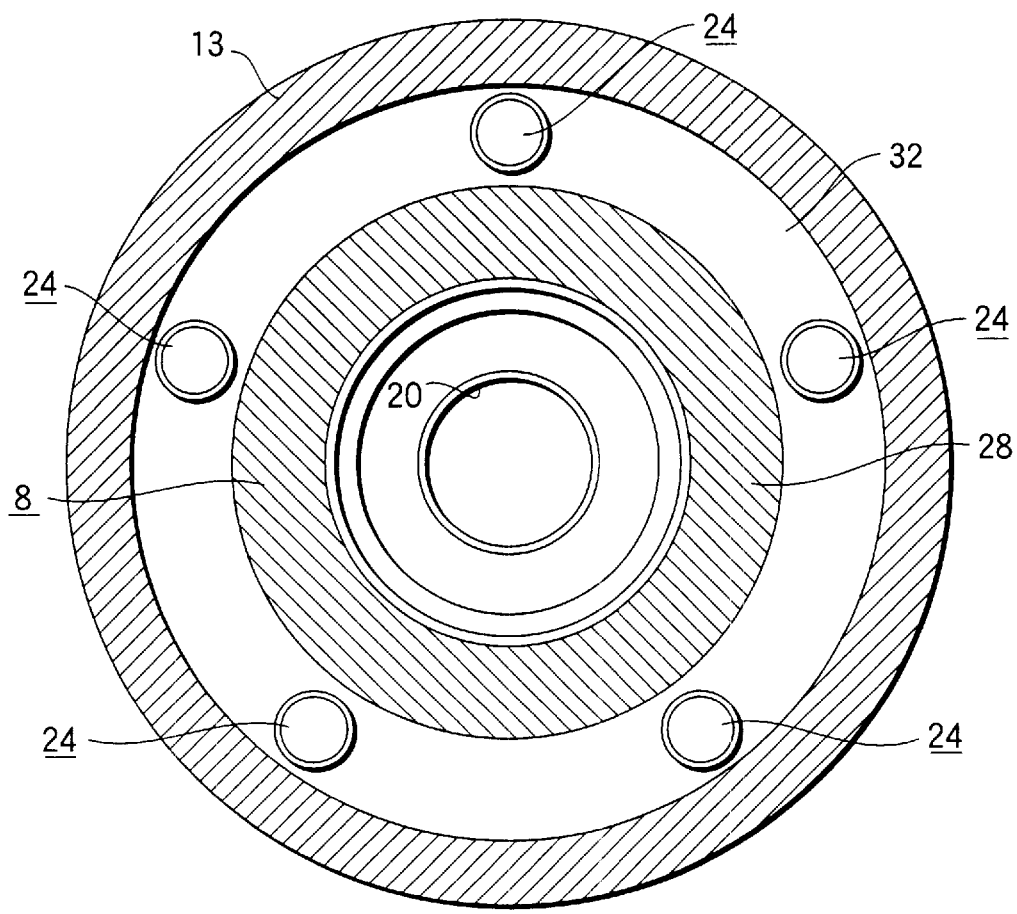
FIG. 5 is a view seen from the left side of the hub in FIG. 4.

For smoothly carrying out the finish process as mentioned above in spite of the existence of the studs 24, in this embodiment, a ring shaped concave portion 32 is formed allover the circumference in the intermediate portion in the circumferential direction of the mounting surface 28 of the flange 13. One end (the left end in FIGS. 4 and 6) in the axial direction of the mounting hole 23 opens within the concave portion 32. Under the condition where the studs 24 are fixed to the mounting flange 13, projecting parts (excepting the collar 25) of the studs 24 from the mounting surface 28 exist between an imaginary cylindrical face including the outer circumference edge of the concave portion 32 shown with a two-dotted line a and an imaginary cylindrical face including the inner circumference shown with a two-dotted line β (the white part of FIG. 5 is a cross section). Accordingly, when finish-processing by the finishing tools 31, 31, no interference occurs between the finishing tools 31, 31 and the studs 24.

For manufacturing the exemplified wheel bearing unit, the outer circumference of the intermediate portion of the hub 8 shown at the upper halves with the slant lattices in FIGS. 4 and 6 is hardened through the high frequency hardening as one kind of the heat treatments, and the base ends of the studs 24 are press-fitted into the mounting holes 23 of the mounting flange 13. Then, the portion (slant lattice in FIG. 5) of the mounting surface 28 sandwiching the concave portion 32 from the both sides thereof in the radial direction is processed to be a predetermined configuration by means of the finishing tools 31, 31. Irrespective of the order of the high frequency hardening treatment and the press-fitting to fix the stud 24, in order to be easy to perform the hardening treatment, it is desirable to at first start the hardening treatment.

In any event, in this example, the outer peripheral part (FIGS. 4 and 6) of the intermediate portion of the hub 8 is performed with the high frequency heating treatment for hardening the part of slant lattice, and then, after the deformation based on the heat treatment occurs in the hub 8 and the mounting surface 28 is generated with deformation accompanied with the press-fitting insertion of the studs 24 in the mounting surface 28, the mounting surface 28 is performed with the machining such as the lathe to be flat surface perpendicular to the central axis of the hub 8. After the mounting surface 28 is made a regular flat surface, this mounting surface 28 is utilized as a reference face similarly to the first embodiment, so that the inner ring raceway 14a and the outer circumference of the small-diameter stepped portion 15 and the stepped surface shown with the dotted lines in FIGS. 4 and 6 are subjected to the machining to be desired configurations such as the grinding process or the precision machining process as shown in FIGS. 6 and 7.

Also in this embodiment, the relative position is regular between the mounting surface 28, the inner ring raceway 14a directly formed in the outer circumference of the intermediate portion of the hub 8 and the inner ring raceway 14b in the outer circumference of the inner ring 16 (FIG. 1) externally fitted on the small-diameter stepped portion 15, in spite of the thermal deformation due to the high frequency hardening treatment or deformation by press-fitting of the studs 24. As a result, under the condition of assembling the wheel bearing unit 5, the deflection of the mounting surface 28 can be restrained to be least, and the deflection of the rotor 2 (FIG. 8) fixedly secured to the mounting flange 13 can be restrained to be least. In this connection, it is preferable that the bearing unit is designed so that the width of deflection of the mounting surface 28 of the mounting flange 13 during rotation is 17 μm or less.

The invention can be of course practiced in not only the bearing units for the driving wheels as illustrated but also bearing units for driven wheels. Omitting sketches, it is possible to combine the inventions described in the first aspect and the second aspect. Preferably, the mounting hole 23 for press-fitting the stud 24 thereinto is processed in a single axis, because the inner diameter of the mounting hole 23 is exactly finished to make constant a difference (margin for press-fitting insertion) between this inner diameter and the outer diameter of the base portion of the stud. With respect to working for press-fitting to fix the base portions of the respective studs 24 in the plurality of mounting holes 23, it is sufficient to press-fit the stud into the hole one by one, and the plurality of studs 24 (ordinarily 4 to 6 pieces) to be mounted to one sheet of the mounting flange 13 can be inserted into all of mounting holes 23 at the same time. If the mounting flange 13 is provided at one part with a projecting part 27, in case the circumferential parts of the respective mounting holes are thicker, even if inserting one by one piece of the stud 24, it is possible to suppress deformation harmful to the mounting surface 28 of the flange 13. Further, if the plurality of studs 24 are inserted into all of the mounting holes 23 simultaneously, the deformation caused in the mounting surface 28 can be further lessened. In the invention as set forth in the second aspect, the mounting surface 28 is processed after press-fitting the studs 24, so that the precision in shape of the mounting surface 28 is not affected with bad influences thereby. Thus, no especial care is needed to the press-fitting manner of the studs 24.

The wheel bearing unit and the method of manufacturing the same of the invention are composed as mentioned above, and so unpleasant noises generated when braking can be therefore checked, not especially heightening cost.

While only certain embodiments of the invention have been specifically described herein, it will apparent that numerous modifications may be made thereto without departing from the spirit and scope of the invention.

What is claimed is:

1. A method of manufacturing a bearing unit, including:
   a stationary ring having a stationary-side raceway surface provided at a stationary-side periphery thereof, and fixedly supported by a suspending apparatus under a condition of being used;
   a rotary ring having a rotary side-raceway surface provided at the rotary side-periphery thereof and hardened by a heat treatment;
   a plurality of rolling elements provided between the rotary side-raceway surface and the stationary-side raceway surface;
   a mounting flange provided at the outer periphery of the rotary ring, for fixedly connecting a rotary body for braking and a wheel to a mounting surface which is one side surface thereof under a condition of being used, said mounting flange having plural mounting holes communicating between the one side surface and the other side surface; and
   a plurality of studs, each of which has a distal end protruded from the mounting surface under a condition where the respective base portions thereof are press-fitted into plural mounting holes of the mounting flange, the method comprising:
   hardening the rotary side-raceway surface of the rotary ring by a heat treatment;
   press-fitting the base portion of each stud into each hole of the mounting flange to fix the stud therein;
   processing the mounting surface of the mounting flange into a predetermined configuration; and
   processing the rotary side-raceway surface into a predetermined configuration and dimension by utilizing the processed mounting surface as a reference surface.

2. A method of manufacturing a bearing unit for a wheel, comprising:
   providing a stationary ring having a stationary-side raceway surface at a stationary-side periphery thereof, and fixedly supported by a suspending apparatus under a condition of being used;
   providing a rotary ring having a rotary side-raceway surface at the rotary side-periphery thereof;
   hardening said rotary ring by a heat treatment;
   providing a plurality of rolling elements between the rotary side-raceway surface and the stationary-side raceway surface;

providing a mounting flange at the outer periphery of the rotary ring for fixedly connecting a rotary body for braking and a wheel to a mounting surface which is one side surface of the mounting flange under a condition of being used, said mounting flange having a plurality of mounting holes communicating between the one side surface and an other side surface;

press-fitting a plurality of studs into the plurality of mounting holes, so that each stud has a distal end protruding from the mounting surface and a base portion press-fitted into the plurality of mounting holes;

processing the mounting surface of the mounting flange into a predetermined shape, after the rotary side-raceway surface thereof has been heat-treated and the base portion of each stud has been fixedly press-fitted into the mounting hole.

* * * * *

(12) EX PARTE REEXAMINATION CERTIFICATE (7568th)
United States Patent
Kaneka

(10) Number: US 6,672,679 C1
(45) Certificate Issued: Jun. 22, 2010

(54) BEARING UNIT FOR WHEEL AND METHOD OF MANUFACTURING THE SAME

(75) Inventor: Takeyasu Kaneka, Kanagawa (JP)

(73) Assignee: NSK Ltd., Tokyo (JP)

Reexamination Request:
No. 90/008,241, Sep. 25, 2006

Reexamination Certificate for:
Patent No.: 6,672,679
Issued: Jan. 6, 2004
Appl. No.: 09/789,846
Filed: Feb. 22, 2001

(30) Foreign Application Priority Data

Feb. 23, 2000 (JP) ................................. P2000-045479

(51) Int. Cl.
*B60B 27/00* (2006.01)

(52) U.S. Cl. ............ 301/105.1; 188/18 A; 188/218 XL; 29/898.09; 301/6.1; 384/544

(58) Field of Classification Search ............ None
See application file for complete search history.

(56) References Cited

U.S. PATENT DOCUMENTS

| | | | |
|---|---|---|---|
| 2,067,620 A | * 1/1937 | Johnston et al. ............ 301/36.1 |
| 2,288,474 A | * 6/1942 | Manning .................... 301/36.1 |
| 2,334,673 A | * 11/1943 | Hawthorne ............... 301/105.1 |
| 2,349,220 A | * 5/1944 | Eksergian ................ 301/105.1 |
| 5,430,926 A | 7/1995 | Hartford |
| 5,727,886 A | 3/1998 | Hata et al. |
| 5,782,565 A | 7/1998 | Bertetti et al. |
| 5,884,980 A | 3/1999 | Visser et al. |
| 5,927,820 A | 7/1999 | Vignotto et al. |
| 6,071,180 A | 6/2000 | Becker |
| 6,230,848 B1 | 5/2001 | Niebling et al. |
| 6,280,096 B1 | * 8/2001 | Miyazaki et al. ............ 384/544 |
| 6,415,508 B1 | 7/2002 | Laps |
| 6,523,909 B1 | 2/2003 | Nakamura et al. |
| 2002/0066185 A1 | 6/2002 | Loustanau et al. |

FOREIGN PATENT DOCUMENTS

| | | |
|---|---|---|
| JP | 56-139602 U | 10/1981 |
| JP | 7-164809 A | 6/1995 |
| JP | 7-186601 A | 7/1995 |
| JP | 11-129703 A | 5/1999 |
| JP | 11-294425 A | 10/1999 |
| WO | 857 880 A1 | 8/1998 |
| WO | 00/73091 A1 | 12/2000 |

OTHER PUBLICATIONS

English translation of JP 11-129703 A (Miyazaki et al.), published May 18, 1999.*

*U.S. Fed Circuit Court of Appeals, Biovail v. Andrx Pharmacueticals*, pp. 1–13, 239 F. 3d 1297, 57 USPQ2d1813 (2001).

* cited by examiner

*Primary Examiner*—Peter C. English

(57) ABSTRACT

At a surface opposite to a mounting surface 28 at a part of the mounting flange 13, a projecting part 27 is provided so as to surround the opening part of the mounting holes 23 for press-fitting each stud thereinto. A finishing process of the mounting surface 28 is carried out after the stud 24 is press-fitted into the mounting hole 23.

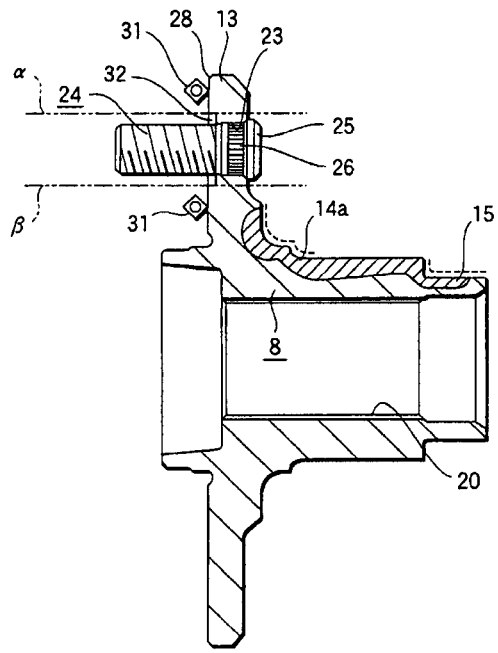

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 2 is cancelled.

Claims 1 and 3 were not reexamined.

*3. The method of manufacturing a bearing unit according to claim 1, wherein a portion surrounding each of said mounting holes is thicker in an axial direction compared to a remaining portion of the mounting flange.*

\* \* \* \* \*